United States Patent

Moore

Patent Number: 5,249,901
Date of Patent: Oct. 5, 1993

[54] SPRING SEATED FASTENER

[76] Inventor: Richard B. Moore, 636 Wellington Cresent, Mount Clemens, Mich. 48043

[21] Appl. No.: 954,534

[22] Filed: Sep. 29, 1992

[51] Int. Cl.⁵ .................... F16B 37/04; F16B 37/16
[52] U.S. Cl. ........................... 411/182; 411/437; 411/527; 29/525.1
[58] Field of Search ........... 411/180, 182, 427, 437, 411/527, 82; 29/510, 525.1

[56] References Cited

U.S. PATENT DOCUMENTS

| | | | |
|---|---|---|---|
| 2,165,765 | 7/1939 | Place | 411/180 |
| 2,236,929 | 4/1941 | Tinnerman | 411/527 |
| 2,382,936 | 8/1945 | Bedford, Jr. | 411/527 |
| 3,027,609 | 4/1962 | Parkin et al. | 411/180 X |
| 3,203,302 | 8/1965 | Frederick | 411/527 X |
| 4,518,293 | 5/1985 | Pleickhardt et al. | 411/182 X |
| 4,941,788 | 7/1990 | Highfield | 411/180 X |

*Primary Examiner*—Neill R. Wilson
*Attorney, Agent, or Firm*—Barnes, Kisselle, Raisch, Choate, Whittemore & Hulbert

[57] ABSTRACT

A fastener assembly with a recess in a part in which a nut is received with resilient fingers engaging with an interference fit the periphery of the recess to retain the nut therein. A fastener with a threaded stud is engaged and retained by a threaded hole through the nut. Preferably, the nut is a relatively thin and generally flat plate with the threaded hole formed by displacing a portion of the plate around the periphery of the hole.

14 Claims, 1 Drawing Sheet

SPRING SEATED FASTENER

This invention relates generally to fasteners and more particularly to a fastener with a retainer nut seated in a recess in a part.

BACKGROUND

Prior retainer nuts are usually difficult to accurately install and repeatably position, thereby decreasing part quality, increasing labor costs and often requiring special part geometries to facilitate assembly. Some clips referred to as "J-nuts" can only be assembled adjacent the edge of a part or flange. When installing "J-nuts", the part has a slightly oversized clearance hole, and the loose-fit placement of the J-nut permits shifting to locate the threaded nut at the required position. Other fasteners utilize a brass stud with a fluted outer periphery which provides torsional retention when threading a bolt onto the stud. These brass stud inserts are heavy, thick and require molding the part around them. Most retainer nuts are designed for a specific size fastener, require close tolerances, and do not precisely and accurately position themselves within the part.

SUMMARY

A fastener with a threaded stud and retainer nut which can be accurately, quickly and easily installed in a complementary recess in a part. Once installed the nut will retain itself in the recess. This retainer nut is a single plate having a substantially planar shaped body with a plurality of somewhat flexible tabs integrally connected and extending from the body to engage the periphery of a complementary recess in a part.

The nut body is preferably a substantially planar plate of flexible resilient material such as spring steel. The plurality of tabs extending from the body are proportioned to receivably engage with an interference fit a side wall of a complementary recess in a part. The tabs resiliently engage with the side wall upon forcing the nut into the recess, thereby retaining the nut. Preferably, the tabs are semi-circular and extend outwardly from the body of the nut at an acute included angle to the plane of the body of about 20° to 45°.

The nut has a threaded portion, preferably formed by displacing the periphery of a central hole through the body, which receives a complementarily threaded shank of a fastener such as a bolt.

This fastener also accommodates a wide range of different threaded stud diameters while utilizing the same size recess in a workpiece by simply using nuts with the same outer peripheral dimensions and different thread hole sizes. This permits both different size fastener studs to be readily used within one particular part and the same size nut to be used with a wide variety of different parts.

Objects, features and advantages of this invention are to provide a fastener with a retainer nut which can be quickly and easily installed at any location in a part capable of receiving a complementary recess, does not require special installation tools, facilitates assembly by automated machinery, is self-aligning within the recess hole, is self-retaining once installed within the recess hole, is capable of accommodating a broad range of fastener stud sizes within a particular recess hole size, can be used with parts of varying thickness, and is of simplified design and economical manufacture, installation, removal and assembly.

BRIEF DESCRIPTION OF THE DRAWINGS

These and other objects, features and advantages will be apparent from the following detailed description, appended claims and accompanying drawings in which:

DETAILED DESCRIPTION

Figure 1:
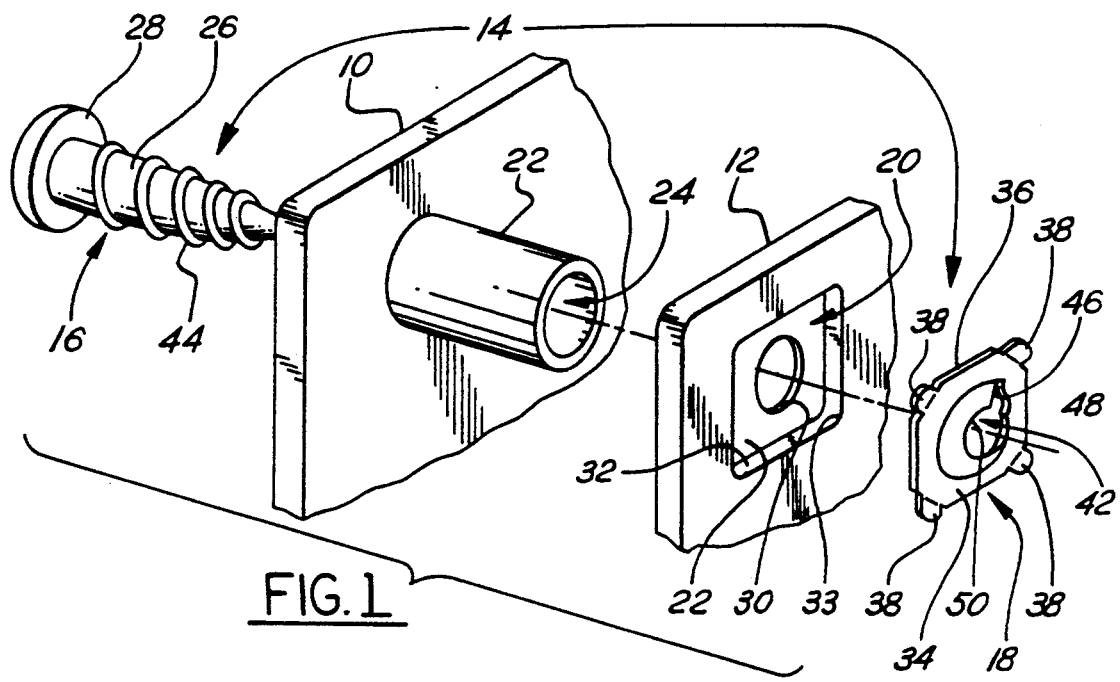
FIG. 1 is an exploded perspective view showing a fastener assembly of this invention in association with a first part having a recess and a second part having a sleeve through which a threaded fastener is received.

FIG. 1 illustrates first and second parts 10 and 12 to be secured together by a fastener assembly 14 embodying this invention with a threaded bolt 16 and a nut 18 receivable in a complementary recess 20 in the part 12. The part 10 preferably, but not necessarily, has a preferably integral spacer sleeve 22 with a through hole 24 through which the shank 26 of the bolt is received. In assembly, the head 28 of the bolt bears on the rear face of the part 10.

Preferably, the recess 20 has a generally flat bottom 22 with a central through hole 30 and an upstanding peripheral side wall 32. Preferably, the side wall has a non-circular configuration which is desirably rectangular and preferably square with rounded corners 33.

Preferably, the nut 18 has a one-piece body in the form of a generally flat and planar plate 34 with side edges 36 generally complementary to and preferably having a relatively close sliding fit with the side wall 32 of the recess.

Figures 2, 3:
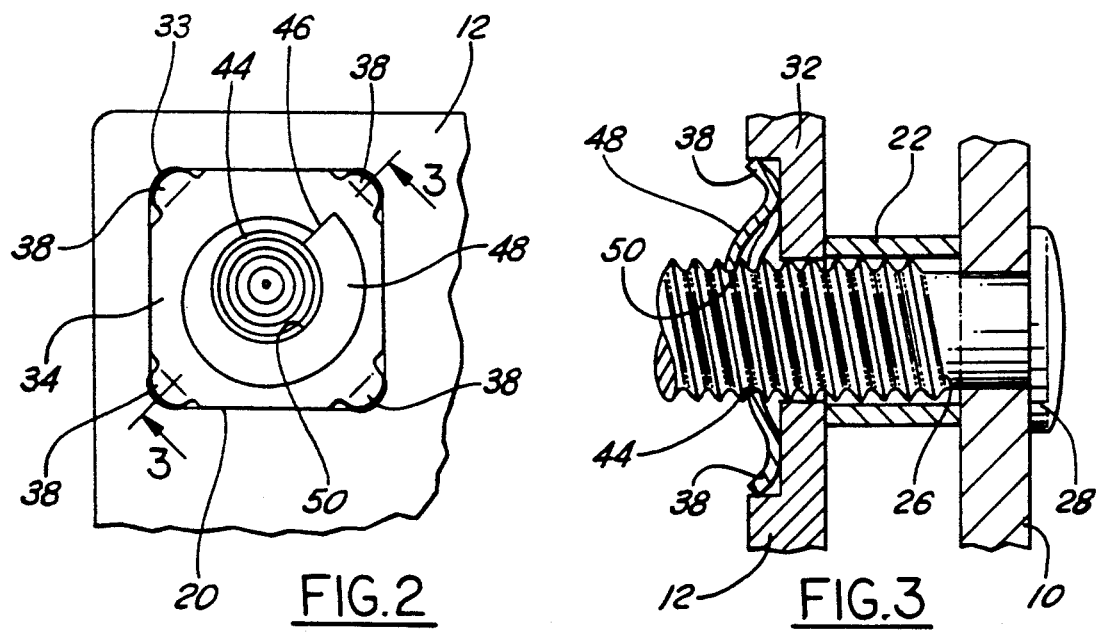
FIG. 2 is an end view of the retainer nut disposed in the recess and engaged with the threaded fastener.
FIG. 3 is a sectional view taken along the line 3—3 in FIG. 2.

As shown in FIGS. 1-3, the nut has four integral tabs 38 adjacent its corners which are proportioned and arranged to have an interference fit with adjacent portions of the peripheral side wall 32 and/or corners 33 when the nut is disposed in the complementary recess. To facilitate insertion of the nut into the recess and retention therein, preferably each tab 38 extends outwardly at an acute included angle 40 to the planar face of the bottom of the nut of about 20° to 45° and preferably about 25° to 30°. Preferably, to facilitate insertion and retention of the nut, it is made of a somewhat resilient material, such as sheet metal or spring steel. Usually, a nut of spring steel has a nominal material thickness of about 0.022 to 0.037 of an inch.

Figures 4, 5:
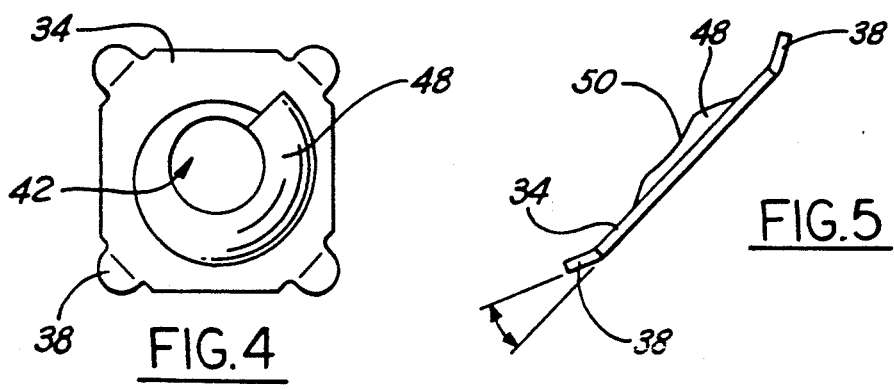
FIG. 4 is an end view of the retainer nut.
FIG. 5 is an edge view of the retainer nut.

The nut has a central through hole 42 threaded for mating engagement with the threads 44 of the shank 26 of the fastener. Preferably, the threaded hole of the nut is provided by forming a slot 46 extending generally radially from the hole and displacing a portion 48 of the nut around the periphery of the hole to provide a spiraled edge 50 having a pitch corresponding to that of the threads 44 of the fastener for mating engagement therewith. Preferably, the displaced spiral portion 48 has a generally dome-like configuration (FIGS. 3 and 4) with its apex raised from the planar portion of the body 34.

To install the fastener assembly 14, preferably the nut 18 is forced into the recess 20 so that one or more of its tabs 38 are flexed and firmly engage the side wall 32 and/or corners 33 of the recess to retain the nut therein. Preferably, the nut is forced into the recess sufficiently so that it seats and bears on the bottom of the recess.

The parts 10 and 12 are then disposed (generally as shown in FIG. 1), so that the hole 24 through the sleeve 22 of the first part is aligned with the holes 30 & 42 through the second part and the nut with the recess opening away from the first part. The bolt 16 is inserted into the sleeve 22 through the part 10 and threaded into the nut to secure the two parts together. Tightening the bolt 16 tends to draw the nut 18 into the recess 20 and firmly seat the nut in the bottom of the recess if it was not already so seated.

Alternatively, the fastener assembly 14 can be installed by loosely assembling the two parts 10 and 12 and the bolt nut 16 and 18 and then generally aligning the nut with the recess 20 and tightening the bolt to draw the nut into the recess so that its resilient tabs 38 flex and engage the side wall 32 and/or corners 33, the nut seats in the bottom of the recess, and the fastener assembly firmly draws the parts together.

The tabs 38 prevent inadvertent backward assembly of the nut 18 in the recess 20. Retention of the nut within the recess is sufficient to prevent inadvertent disengagement, yet provide for disassembly for recycling.

The fastener assembly may be used with a wide variety of threaded fasteners, such as bolts, studs, sleeves, screws, and other fasteners with tapered shanks, and the like.

The fastener assembly can accommodate a wide range of fasteners with different diameter threaded shanks by using nuts and recesses having the same outer periphery and simply a different diameter threaded hole through the nut. When assembled, the nut is securely retained in the recess. The forcible seating and somewhat resilient engagement of the nut 18 within the recess 20 of the part 12 provides for a simple one-piece fastener nut which can be quickly and easily installed, such as by automated machinery and processes, either preceding or following plating or painting of the part carrying the nut, does not necessarily require special installation tools, is self-aligning within the recess hole and is self-retained once installed within the recess hole. The fastener nut also provides for accommodation of a broad range of fastener sizes within one particular recess hole size.

The recess prevents attachment of the nut to the wrong side of a part and the tabs prevent the nut from being inadvertently installed backwards in the recess. The fastener may be utilized with relatively thin parts and installed within curved surfaces of parts and virtually anywhere in a part. For most assemblies, the fasteners reduce the weight, material required and heat treating and finishing costs. The fasteners can usually be used in lieu of many relatively expensive fastening techniques such as insert molding, heat staking, ultra-sonic welding cold and hot and upsetting.

What is claimed is:

1. A retainer nut for receipt in a recess of a part and engagement with a threaded shank comprising:
   a generally plate shaped body;
   a plurality of somewhat flexible tabs integral with and extending from said body, said tabs having a generally semicircular edge;
   a hole through a central portion of said body;
   a displaced portion of said body around the periphery of said hole providing a threaded portion to receive a complementarily threaded shank of a fastener; and
   said body being constructed, arranged and dimensioned to be received in a complementary recess having portions forming an interference fit with said edges of said tabs to facilitate firm engagement and retention of said nut within said recess when forced into said recess.

2. The retainer nut of claim 1 wherein said body is generally square.

3. The retainer nut of claim 1 wherein said body is generally rectangular.

4. The retainer nut of claim 1 wherein said body is of sheet metal.

5. The retainer nut of claim 1 wherein each tab extends from said body at an acute included angle to the plane of the bottom face of said body of about 20° to 45°.

6. The retainer nut of claim 1 which also comprises a raised central portion about said hole of said body.

7. The retainer nut of claim 1 wherein said body is of spring steel.

8. A fastener assembly for a part which utilizes a fastener member with a threaded shank, the assembly comprising: a recess in the part having a bottom, an upstanding side wall with a non-circular periphery and a hole through the bottom of said recess and the part for receiving the threaded shank of the fastener member, a nut having a generally plate like body with a non-circular periphery generally complementary with the periphery of said recess, said body being receivable in said recess, a plurality of somewhat flexible tabs integral with and extending from said body and being constructed, arranged and dimensioned to have an interference fit with at least portions of said peripheral wall of said recess when received in said recess for retaining said nut therein, a hole through a central portion of said body which is generally aligned with said hole through the bottom of said recess when said body is received in said recess, a portion of said body around the periphery of said hole being displaced from the bottom face of said body in a spiral forming a threaded portion complementary to and for threaded engagement with the shank of the fastener member.

9. The fastener assembly of claim 8 wherein said body of said nut is of sheet metal.

10. The fastener assembly of claim 8 wherein said body of said nut is of spring steel.

11. The fastener assembly of claim 8 wherein each tab extends from said retainer body at an acute included angle to the plane of the bottom face of said body of about 20° to 45°.

12. The fastener assembly of claim 8 wherein said body also has a raised central portion about said hole through said body.

13. A fastener method comprising the steps of:
   providing a fastener member with a threaded shank,
   providing a recess in a part and having a bottom, an upstanding side wall with a non-circular periphery, and a hole through the bottom of the recess and the part for receiving the threaded shank of the fastener member,
   providing a retainer nut having a generally plate-like body with a non-circular periphery generally complementary with a plurality of somewhat flexible tabs integral with and extending from the body, a hole through a central portion of the body, and a displaced portion of the body around the periphery of the hole providing a threaded portion to receive a complementarily threaded shank of a fastener, aligning and positioning the retainer nut with the complementary recess in the part, applying force to the retainer nut to dispose the nut in the recess and flex at least one of the plurality of tabs extending from the body of the nut into an interference fit in the recess, and inserting the threaded shank portion of a fastener through the clearance hole in the part and into threaded engagement with the displaced periphery of the hole forming a thread in the retainer nut.

14. The fastener method of claim 13 with the part providing the recess being constructed from plastic and comprising the additional step of:

ultra-sonically welding along the periphery of the recess in the part to further retain and trap the nut in the part.

* * * * *